(12) United States Patent
Cox et al.

(10) Patent No.: US 9,327,278 B1
(45) Date of Patent: May 3, 2016

(54) PROCESS FOR CATALYST REGENERATION

(71) Applicant: UOP LLC, Des Plaines, IL (US)

(72) Inventors: Pelin Cox, Des Plaines, IL (US); Deng-Yang Jan, Elk Grove Village, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/574,303

(22) Filed: Dec. 17, 2014

(51) Int. Cl.
*B01J 38/12* (2006.01)
*B01J 29/90* (2006.01)
*B01J 38/20* (2006.01)

(52) U.S. Cl.
CPC . *B01J 29/90* (2013.01); *B01J 38/20* (2013.01)

(58) Field of Classification Search
CPC ........................................ B01J 38/12
USPC .......................................... 502/38
See application file for complete search history.

(56) References Cited

U.S. PATENT DOCUMENTS

| | | | |
|---|---|---|---|
| 4,274,942 A | 6/1981 | Bartholic |
| 4,769,128 A | 9/1988 | Boyle |
| 4,806,699 A | 2/1989 | Smith |
| 5,155,075 A | 10/1992 | Innes |
| 5,198,397 A | 3/1993 | Raterman |
| 5,248,408 A | 9/1993 | Owen |
| 5,597,537 A | 1/1997 | Wegerer |
| 6,660,158 B1 | 12/2003 | Ellingsen |
| 6,916,417 B2 | 7/2005 | Mayes |
| 7,470,644 B2 | 12/2008 | Dirkx |
| 7,915,191 B2 | 3/2011 | Hedrick |
| 8,716,161 B2 | 5/2014 | Wu |
| 8,835,706 B2 | 9/2014 | Iyer |
| 2012/0302433 A1 | 11/2012 | Peat |
| 2013/0131414 A1 | 5/2013 | Iyer |

FOREIGN PATENT DOCUMENTS

| | | |
|---|---|---|
| EP | 650395 B1 | 9/1999 |
| EP | 1390135 B1 | 10/2009 |
| RU | 2497929 C1 | 11/2013 |
| WO | 2014144855 A2 | 9/2014 |

OTHER PUBLICATIONS

Scruton, "Cyclar process tested: aromatics from LPG", The Institute of Petroleum, Petroleum Review, Jun. 1991, p. 270-272.
Claude, "Holding the Key", Reprinted from Hydrocarbon Engineering, Mar. 2008, www.hydrocarbonengineering.com.
Letzsch, "Stone & Webster-Institut Francais du Petrole Fluid RFCC Process" Catalytic Cracking, Chapter 3.4, p. 3.71-3.94.
Palmas, "25 Years of Development", Reprinted from Hydrocarbon Engineering, Jun. 2009, www.hydrocarbonengineering.com.
U.S. Appl. No. 14/574,293, filed Dec. 17, 2014, Jan et al.
U.S. Appl. No. 14/574,288, filed Dec. 17, 2014, Cox et al.
U.S. Appl. No. 14/574,311, filed Dec. 17, 2014, Cox et al.

*Primary Examiner* — Edward Johnson

(57) ABSTRACT

A process is disclosed for an improved catalyst regeneration process to improve catalyst stability and hence increase overall catalyst life. The process includes passing a spent catalyst stream to a first, or upper, combustion zone to partially regenerate the catalyst through controlled combustion of the carbon on the catalyst. The first combustion zone will burn off a high fraction of hydrogen at lower temperatures generating a large fraction of $H_2O$. The partially regenerated catalyst is passed to a second, or lower, combustion zone to burn off the remaining coke at the needed high severity operation. The second combustion zone will burn off the remaining coke at a higher temperature and higher oxygen gas inlet concentration.

16 Claims, 1 Drawing Sheet

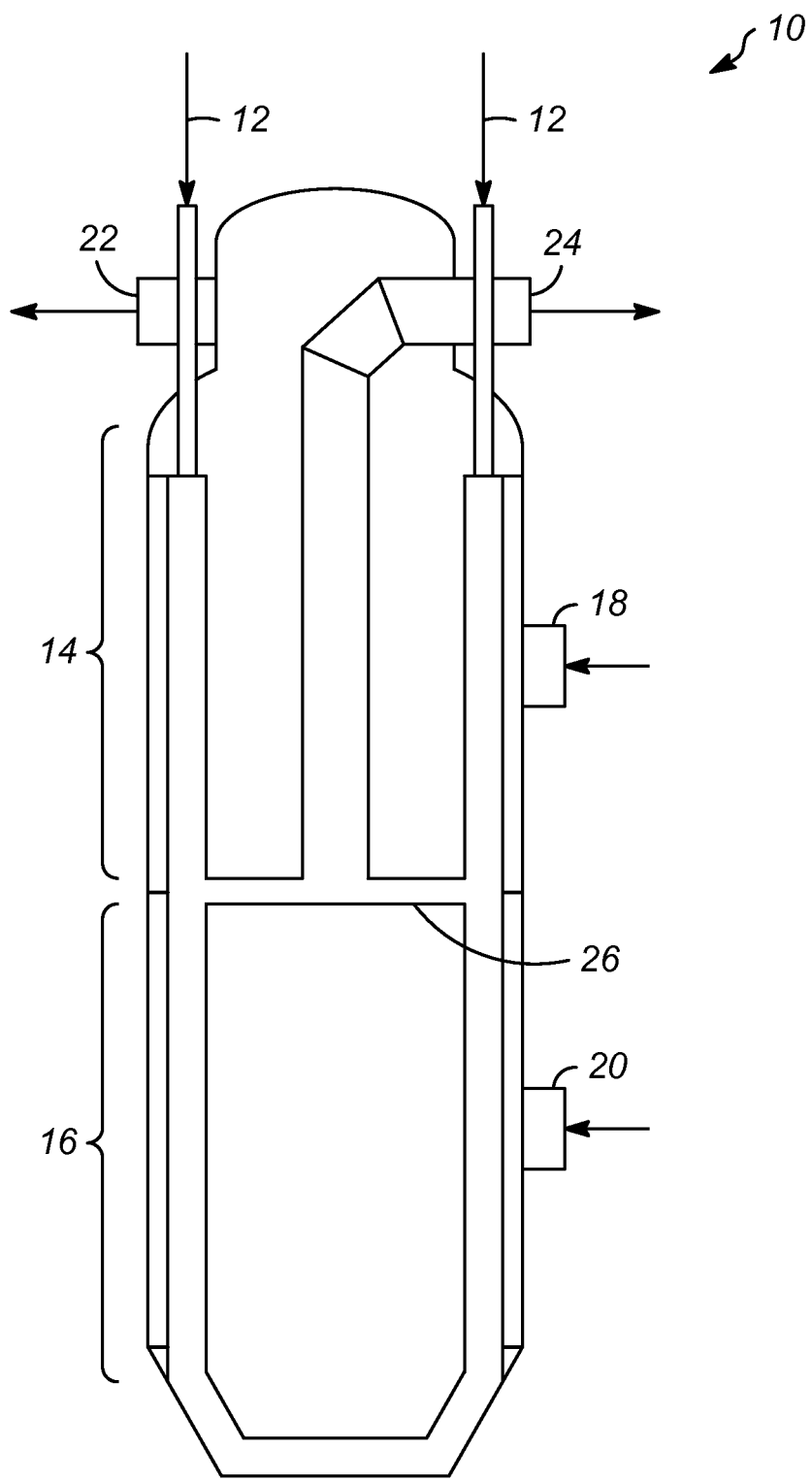

PROCESS FOR CATALYST REGENERATION

FIELD

The present subject matter relates generally to methods for hydrocarbon conversion. More specifically, the present subject matter relates to methods for continuous regeneration of spent catalyst for reuse in the hydrocarbon conversion process.

BACKGROUND

Hydrocarbons, and in particular petroleum, are produced from the ground as a mixture. This mixture is converted to useful products through separation and processing of the streams in reactors and separation equipment. The conversion of the hydrocarbon streams to useful products is often through a catalytic process in a reactor. The catalysts can be solid or liquid, and can comprise catalytic materials. In bi-functional catalysis catalytic materials of acid such as zeolite and metals such as those in transition and main groups are combined to form a composite to facilitate the conversion process such as the one described in this subject application. During the processing of the hydrocarbons, the catalysts deactivate over time. One primary cause of deactivation is the generation and buildup of coke on the catalyst. The accumulation of coke covers or blocks access to catalytic sites on the catalyst. The regeneration of the catalyst is normally performed through the removal of the coke, where the coke is combusted at a high-temperature with a gas having oxygen. These processes can be performed either in a continuous manner with the catalyst cycled through the reactor and the regenerator, or the process can be performed in a semi-continuous manner, such as with multiple fixed beds, where one bed is taken off stream to regenerate the catalyst, while the other beds continue operation.

With the continuous regeneration process, a recycle gas is continuously passed to the combustion zone in the regenerator and a flue gas containing the combustion products is removed. The combustion process is controlled through the temperature and the oxygen content of the recycle gas. The recycle gas stream comprises a portion of the flue gas, and an additional stream of new combustion gas, while venting another portion of the flue gas from the regenerator. This helps maintain the temperature of the combustion gas, as well as setting up a steady state condition of continuous addition of spent catalyst and combustion gas to the regenerator, while continuously drawing regenerated catalyst and flue gas.

Catalyst regeneration methods are disclosed in U.S. Pat. No. 5,053,371 to Williamson, and U.S. Pat. No. 6,048,814 to Capelle, et al. for removing coke from catalyst particles through combustion. The combustion process can be damaging to the catalyst, and better methods of control of the combustion process are important for improving the life of the catalyst in the reactor-regenerator cycle. Frequency of regeneration for a given process is determined by the rate at which carbonaceous residue collects on the catalyst and causes conversion performance of the catalyst to decline. Processes that utilize molecular sieves also require continuous regeneration and have high susceptibility of chronic hydrothermal damage, significantly shortening catalyst stability, and overall life cycle. These types of processes need a regeneration design that minimizes the hydrothermal damage. Producing a better process allows for more cycles of the catalyst through the regenerator, and increases the life of the catalyst. This can be achieved through improvements in the process and control of the regenerator.

Coke deposits on the catalyst is made up of carbon and hydrogen where the combustion of hydrogen generates $H_2O$ as the combustion byproduct. Hydrocarbon processes such as dehycrocyclodimeraization utilize a catalyst made up of zeolitic material and hydrothermal de-alumination accounts for the majority of catalyst deactivation over the life of the commercial operation cycle. The propensity of zeolitic materials to dealuminate increases as water concentration and temperature increase. The standard design of catalyst regeneration burn zones are such that it can achieve complete coke burn and consequently due to high temperature requirements to achieve a regenerated catalyst carbon specification, burn zones operate at high severity.

Accordingly, it is desirable to develop methods for regenerating the catalyst that minimize the hydrothermal damage to the catalyst while maximizing coke burn. Furthermore, other desirable features and characteristics of the present embodiments will become apparent from the subsequent detailed description and the appended claims, taken in conjunction with the accompanying drawings and this background.

SUMMARY

The present subject matter provides an improved catalyst regeneration process. The process includes passing a spent catalyst stream to a first, or upper, combustion zone to partially regenerate the catalyst through controlled combustion of the coke on the catalyst. The first combustion zone will burn off a high fraction of coke at lower temperatures. The partially regenerated catalyst with a low fraction of remaining hydrogen and carbon is passed to a second, or lower, combustion zone to complete the regeneration of the catalyst. The second combustion zone will burn off the remaining coke at a higher severity having a higher temperature and higher oxygen gas inlet concentration.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

DEFINITIONS

As used herein, the term "dehydrocyclodimerization" is also referred to as aromatization of light paraffins. Within the subject disclosure, dehydrocyclodimerization and aromatization of light hydrocarbons are used interchangeably.

As used herein, the term "stream", "feed", "product", "part" or "portion" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. Each of the above may also include aromatic and non-aromatic hydrocarbons.

Hydrocarbon molecules may be abbreviated $C_1$, $C_2$, $C_3$, Cn where "n" represents the number of carbon atoms in the one or more hydrocarbon molecules or the abbreviation may be used as an adjective for, e.g., non-aromatics or compounds. Similarly, aromatic compounds may be abbreviated $A_6$, $A_7$, $A_8$, An where "n" represents the number of carbon atoms in the one or more aromatic molecules. Furthermore, a superscript "+" or "−" may be used with an abbreviated one or more hydrocarbons notation, e.g., $C_{3+}$ or $C_{3-}$, which is inclusive of the abbreviated one or more hydrocarbons. As an example, the abbreviation "$C_{3+}$" means one or more hydrocarbon molecules of three or more carbon atoms.

As used herein, the term "zone" can refer to an area including one or more equipment items and/or one or more sub-zones. Equipment items can include, but are not limited to, one or more reactors or reactor vessels, separation vessels, distillation towers, heaters, exchangers, pipes, pumps, compressors, and controllers. Additionally, an equipment item, such as a reactor, dryer, or vessel, can further include one or more zones or sub-zones.

As used herein, the term "active metal" can include metals selected from IUPAC Groups that include 6, 7, 8, 9, 10, 13 and mixtures of thereof. The IUPAC Group 6 trough 10 includes without limitation chromium, molybdenum, tungsten, rhenium, platinum, palladium, rhodium, iridium, ruthenium, osmium, zinc and silver. The IUPAC Group 13 includes without limitation gallium, indium.

As used herein, the term "modifier metal" can include metals selected from IUPAC Groups 11-17. The IUPAC Group 11 trough 17 includes without limitation sulfur, gold, tin, germanium and lead.

BRIEF DESCRIPTION OF THE DRAWINGS

The drawing FIGURES depict one or more implementations in accord with the present concepts, by way of example only, not by way of limitations. In the FIGURES, like reference numerals refer to the same or similar elements.

FIG. 1 is a schematic depiction of a regeneration zone having multiple combustion zones for regeneration of catalyst flowing through the regenerator in accordance with various embodiments.

DETAILED DESCRIPTION

The following detailed description is merely exemplary in nature and is not intended to limit the application and uses of the aspects described. Furthermore, there is no intention to be bound by any theory presented in the preceding background or the following detailed description.

FIG. 1 illustrates a flow diagram of various embodiments of the processes described herein. Those skilled in the art will recognize that this process flow diagram has been simplified by the elimination of many pieces of process equipment that may or may not be included in a commercial design, including for example, heat exchangers, process control systems, pumps, fractionation column overhead, reboiler systems, vessel internals etc. which are not necessary to an understanding of the process. It may also be readily discerned that the process flow presented in the drawing may be modified in many aspects without departing from the basic overall concept. For example, the depiction of required heat exchangers in the drawing have been held to a minimum for purposes of simplicity. Those skilled in the art will recognize that the choice of heat exchange methods employed to obtain the necessary heating and cooling at various points within the process is subject to a large amount of variation as to how it is performed. In a process as complex as this, there exists many possibilities for indirect heat exchange between different process streams. Depending on the specific location and circumstance of the installation of the subject process, it may also be desired to employ heat exchange against steam, hot oil, or process streams from other processing units not shown on the drawing.

With reference to FIG. 1, a system and process in accordance with various embodiments includes a regenerator 10. A stream of spent catalyst particles 12 is continuously introduced to a regenerator 10. Although the term continuous is applied to this process herein, the process may be continuous, batch, or a semi-continuous process, for example where small amounts of catalyst are withdrawn from the reactor and passed to the regenerator on a relatively continuous basis. The catalyst particles flow downward through the regenerator 10. The regenerator 10 is divided into an upper combustion zone 14 and a lower combustion zone 16. The upper combustion zone 14 may be separated from the lower combustion zone 16, for example by baffles 26. As catalyst particles 12 flow down through the upper combustion zone 14, a first regeneration gas enters through the upper combustion zone inlet 18 and contacts the catalyst particles 12 to combust the carbon on the catalyst particles. The catalyst particles 12 flow through the upper regeneration zone 14 to provide sufficient time for the carbon to be combusted. The catalyst will have an average residence time in the upper zone between 1 and 6 hours, with a preferred time between 3 and 5 hours.

An advantage of the catalyst regeneration process is that burning the coke in two or more separate zones can effectively remove the carbonaceous deposits to a very low level with minimal hydrothermal damage, while keeping the regenerator size minimal. By one aspect, a first regeneration gas is passed to the first or upper combustion zone 14. As illustrated in FIG. 1, the first regeneration gas may be cycled through a upper combustion zone 14. The regeneration gas includes oxygen, which may be elemental oxygen or may include oxygen within other compounds. In one example, the regeneration gas may include flue gas. Flue gas may include CO, $CO_2$, $H_2O$, $N_2$, $SO_2$, NO, $NO_2$, and $O_2$. The regeneration gas may also include flue gas that forms a recycle gas loop wherein the flue gas stream is continually withdrawn from the process and is admixed with an oxygen-containing gas to replenish consumed oxygen and returned to the initial combustion section as the first regeneration gas. The first regeneration gas is also dried before entering the regeneration zone. In this approach, a portion of the flue gas is vented to maintain a continuous steady flow of regeneration gas. The regeneration gas is heat exchanged to achieve temperatures needed for the combustion before passing to the upper combustion zone as the first regeneration gas stream. The first regeneration gas exits the regeneration zone 10 through the upper combustion zone outlet 22. The first combustion temperature is between 480° C. and 560° C., with a preferable temperature between 500° C. and 550° C. Oxygen is added to the regeneration gas stream such that the first regeneration gas stream has a level of oxygen of between about 0.2 mol % and 3 mol %, with a preferred range of 0.2 mol % to 1.5 mol %. Here, the operating conditions may include an oxygen level and the regeneration streams are passed to the combustion zone to provide the oxygen in the combustion zone.

The regeneration gas enters the upper combustion zone 14. The regeneration gas may be dried before entering the upper combustion zone 14. The oxygen level is monitored in the recycle gas and additional oxygen is added as needed to bring the oxygen levels to within desired ranges as described above. The level of oxygen is set to control the combustion to prevent damage to the catalyst and to the equipment where the combustion occurs. A nitrogen gas stream may additionally be added as a diluent should the oxygen levels need further control. In an alternative, the oxygen containing gas can be mixed with the nitrogen before adding the gas stream to the first regeneration gas stream. Temperature may also be used to control the combustion. Another advantage of the methods catalyst regeneration process is that the multiple burn zones will have temperature control of each inlet gas enterting the individual zones as well as flexibility in controlling oxygen concentration going into each zone.

The upper combustion zone 14 operates at a lower severity than the lower combustion zone 16. Therefore, the temperature is lower in the upper combustion zone 14 than the lower combustion zone 16 or the oxygen level in the upper combustion zone is lower than the lower combustion zone. In the upper combustion zone 14 the deactivated catalyst is contacted with first regeneration gas stream under relatively lower severe first regeneration conditions to remove coke to a first level to produce a partially regenerated catalyst. Since the upper combustion zone 14 is operated at a relatively low severity, it is anticipated that some carbon (coke) deposited on the catalyst may still remain. According to one aspect, the process further includes passing the partially regenerated catalyst to a lower combustion zone 16 where a separate regeneration gas is used to complete the combustion process and to burn off residual carbon on the catalyst to desired or acceptable levels.

According to this aspect, the catalyst is passed from the upper combustion zone 14 to the lower combustion zone 16, where the catalyst is contacted with a second regeneration gas stream under second regeneration conditions for removing the residual carbon. The second regeneration gas enters through the lower combustion zone inlet 20 and is cycled through the lower combustion zone 16, where flue gas from the lower combustion zone 16 is part of the circulating gas. The flue gas may include $CO$, $CO_2$, $H_2O$, $N_2$, $SO_2$, $NO$, $NO_2$, and $O_2$. The second regeneration gas is recycled wherein the flue gas stream is continually withdrawn from the process and is admixed with an oxygen-containing gas to replenish consumed oxygen and returned to the lower combustion section as the second regeneration gas. The second regeneration gas may be dried before entering the lower combustion zone 16. The second regeneration gas exits the regeneration zone 10 through the upper combustion zone outlet 24. However, it is also contemplated that the first regeneration gas and the second regeneration gas may exit the regeneration zone 10 through the same outlet. A portion of the flue gas is vented to maintain a continuous steady flow of the second regeneration gas. The regeneration gas is heat exchanged to achieve temperatures needed for the second combustion zone before passing to the lower combustion zone 16. The second combustion zone 16 temperature is between 500° C. and 600° C., with a preferable temperature between 540° C. and 560° C. Additional control on the gas composition includes a nitrogen gas stream to add a diluent should the oxygen levels need further control. In an alternative, the oxygen containing gas can be mixed with the nitrogen before adding the gas stream to the second regeneration gas stream.

The lower combustion zone 16 is operated and sized to allow for the catalyst to reside in the lower zone between 1 and 6 hours, with a preferred average residence time between 3 hours and 5 hours. The oxygen concentration in the lower burn zone may be greater than for the upper combustion zone, and is controlled to a level between 1 mol % and 5 mol %.

The second regeneration gas stream may be fed to the regeneration zone so that the second regeneration gas stream is parallel to the first regeneration stream. Further, the first regeneration gas stream and the second regeneration gas stream may include a common gas loop where they share the same controls. For example, if they include the common gas loop the first regeneration gas stream and the second regeneration gas stream may include the same dries, same heat exchangers and temperature control and the same compressor and/or blower for circulation. However, it is also contemplated that the first regeneration gas stream and the second regeneration gas stream may have independent loops. In this configuration, temperature and oxygen content of the first regeneration gas stream and the second regeneration gas stream may be controlled independently from one another. There are also many other configurations that might combine different controls from the combined gas loop and independent gas loop. For example, the first regeneration gas stream and the second regeneration gas stream may include independent temperature controls while having a single oxygen inlet point.

It is contemplated that there may be more than two regeneration zones. Additional zones may be added to minimize the hydrothermal damage. For example, there may be three regeneration zones to regenerate the catalyst. This invention can further minimize hydrothermal damage to the catalyst by dividing the severity of the burn into three steps rather than two steps. This will maximize hydrogen burn at lower severity conditions before the catalyst is exposed to high severity conditions to achieve complete coke burn. By this aspect, the catalyst is passed from the second upper combustion zone to the third combustion zone, where the catalyst is contacted with a third regeneration gas stream under third regeneration conditions for removing the residual carbon.

The third regeneration gas enters through a third combustion zone inlet and is cycled through the third combustion zone, where flue gas from the third combustion zone is the circulating gas. The flue gas may include $CO$, $CO_2$, $H_2O$, $N_2$, $SO_2$, $NO$, $NO_2$, and $O_2$. The third regeneration gas is recycled wherein the flue gas stream is continually withdrawn from the process and is admixed with an oxygen-containing gas to replenish consumed oxygen and returned to the third combustion section as the third regeneration gas. The third regeneration gas may be dried before entering the third combustion zone. The third regeneration gas exits the regenerator through the third combustion zone outlet. However, it is also contemplated that the first regeneration gas, the second regeneration gas, and the third regeneration gas may exit the regeneration through the same outlet. A portion of the flue gas is vented to maintain a continuous steady flow of the third regeneration gas. The regeneration gas is heat exchanged to achieve temperatures needed for to the third combustion temperature before passing to the third combustion zone. The third combustion zone temperature is between 540° C. and 600° C. When there are three zones, the operating conditions for the first and second zones may change. For example, if the temperature for the third zone is between 540° C. and 560° C., the temperature for the first zone may be preferably between 500° C. and 520° C. and the temperature for the second zone may be preferably between 520° C. and 540° C. Additional control on the gas composition may include a nitrogen gas stream to add a diluent should the oxygen levels need further control. In an alternative, the oxygen containing gas can be mixed with the nitrogen before adding the gas stream to the third regeneration gas stream.

The third combustion zone is operated and sized to allow for the catalyst to reside in the lower zone between 1 and 6 hours, with a preferred average residence time between 3 hours and 5 hours. The oxygen concentration in the oxygen boost zone is greater than for the upper combustion zone, and is controlled to a level between 1 mol % and 5 mol %.

The third regeneration gas stream may be fed to the regeneration zone so that is parallel to the first and second regeneration streams. Further, the first regeneration gas stream, the second regeneration gas stream, and the third regeneration gas stream may include a common gas loop. Further, the first, second, and third regeneration gas stream may include a common gas loop where they share the same controls. For example, if they include a common gas loop the first, second, and third regeneration gas stream may include the same temperature control or same oxygen control or same driers or a mixture thereof. However, it is also contemplated that the first regeneration gas stream, the second regeneration gas stream, and the third regeneration gas stream may have independent gas loops. In this configuration the oxygen content, the temperature and the drier system of the first regeneration gas stream, the second regeneration gas stream, and the third regeneration gas stream may be controlled independently from one another. There may be other configurations where some of the components are independent while others are common, for example common oxygen control while having independent temperature control for regeneration gas.

The downstream process includes several zones before the catalyst is sent back to the reactors. These zones include but are not limited to cooling zone, steaming zone, drying zone and reduction zone. After the catalyst exists the burn zone, it flows into the cooling zone where the catalyst is cooled to the desired temperatures needed for the following steaming zone. After the catalyst is steamed in the steaming zone, it flows into the drying zone to be dried before it enters the reduction zone. Finally, the catalyst is dried and reduced before entering back into reaction zone.

Any suitable catalyst may be utilized such as at least one molecular sieve including any suitable material, e.g., alumino-silicate. The catalyst can include an effective amount of the molecular sieve, which can be a zeolite with at least one pore having a 10 or higher member ring structure and can have one or higher dimension. Typically, the zeolite can have a $Si/A_{12}$ mole ratio of greater than 10:1, preferably 20:1-60:1. Preferred molecular sieves can include BEA, MTW, FAU (including zeolite Y and zeolite X), EMT, FAU/EMT intergrowth, MOR, LTL, ITH, ITW, MFI, MSE, MEL, MFI/MEL intergrowth, TUN, IMF, FER, TON, MFS, IWW, EUO, MTT, HEU, CHA, ERI, MWW, AEL, AFO, ATO, and LTA. Preferably, the zeolite can be MFI, MEL, MFI/MEL intergrowth, TUN, IMF, MSE and/or MTW. Suitable zeolite amounts in the catalyst may range from 1-100%, and preferably from 10-90%, by weight.

Generally, the catalyst includes at least one metal selected from active metals, and optionally at least one metal selected from modifier metals. The total active metal content on the catalyst by weight is about less than 2% by weight. In some embodiments, the preferred total active metal content is less than about 1.5%, in yet in another embodiments the preferred total active metal content is less than 1%, still in yet in another embodiment the total active metal content on the catalyst by weight is less than 0.5 wt %. At least one metal is selected from IUPAC Groups that include 6, 7, 8, 9, 10, and 13. The IUPAC Group 6 trough 10 includes without limitation chromium, molybdenum, tungsten, rhenium, platinum, palladium, rhodium, iridium, ruthenium and osmium. The IUPAC Group 13 includes without limitation gallium, indium. In addition to at least one active metal, the catalyst may also contain at least one modifier metal selected from IUPAC Groups 11-17. The IUPAC Group 11 trough 17 includes without limitation sulfur, gold, tin, germanium and lead.

EXAMPLES

The following examples are intended to further illustrate the subject embodiments. These illustrations of different embodiments are not meant to limit the claims to the particular details of these examples. These examples are based on Thermo-gravimetric Analysis (TGA), which includes a furnace with precise temperature control. The sample is placed on an extremely sensitive scale where a gas with known amount of $O_2$ is passed over the sample. The effluent gasses can be monitored by mass spectrometer for CO, $CO_2$, $H_2O$ and other trace combustion products. In addition, weight loss of the sample is monitored. Spent catalysts with varying degrees of coke wt % generated in a pilot plant is then analyzed for coke burn kinetics using TGA. TGA experiments were performed for samples with 0.5 coke wt % to 6 coke wt % with temperatures ranging from 480° C. to 600° C. with 0.5 mol % $O_2$ to 5 mol % $O_2$. Coke burn kinetics were developed for the above mentioned variable ranges. Table 1 is generated using data generated from coke burn studies.

TABLE 1

| Single Burn Zone | | Double Burn Zone | |
|---|---|---|---|
| Catalyst Residence Time in Burn Zone, hr | 9.0 | Catalyst Residence Time in Upper Burn Zone, hr | 4.5 |
| Carbon on Catalyst, wt % | 4 | Carbon on Catalyst, wt % | 4 |
| Regeneration Gas Temperature, ° C. | 550 | Upper Burn Zone Regeneration Gas Temperature, ° C. | 525 |
| Regeneration Gas $O_2$, mol % | 2 | Upper Burn Zone Regeneration Gas $O_2$, mol % | 0.5 |
| Coke burn, wt % | 99 | Upper Burn Zone Coke Burn, wt % | 75 |
| p$H_2$O in Burn Zone, torr | 0.946 | p$H_2$O in Upper Burn Zone, torr | 0.709 |
| | | Catalyst Residence Time in Lower Burn Zone, hr | 4.5 |
| | | Lower Burn Zone Regeneration Gas Temperature, ° C. | 550 |
| | | Lower Burn Zone Regeneration Gas $O_2$, mol % | 2 |
| | | Lower Burn Zone Coke Burn, wt % | 94 |
| | | p$H_2$O in Lower Burn Zone, torr | 0.215 |
| Remaining Coke on Catalyst, wt % | 0.04 | Remaining Coke on Catalyst, wt % | 0.06 |

Table 1 demonstrates the benefits of having a double burn zone design comparable to a single burn design. As shown in the Table 1, the single burn zone operates at high severity to reduce coke wt % to low levels required by the process. As a result, single burn zone design generates high levels of $H_2O$ at high severity conditions. The double burn zone design alleviates this issue by diving the burn zone into a lower severity and a higher severity zones in which the upper burn zone to generates a significant portion of the total $H_2O$ at low severity which minimizes hydrothermal damage to the catalyst. Lower burn zone operates at higher severity to meet low coke levels required by the process.

It should be noted that various changes and modifications to the presently preferred embodiments described herein will be apparent to those skilled in the art. Such changes and modifications may be made without departing from the spirit and scope of the present subject matter and without diminishing its attendant advantages.

SPECIFIC EMBODIMENTS

While the following is described in conjunction with specific embodiments, it will be understood that this description is intended to illustrate and not limit the scope of the preceding description and the appended claims.

A first embodiment of the invention is a method of regenerating a catalyst comprising withdrawing a partially deactivated catalyst having coke formed thereon from a reaction zone wherein the partially deactivated catalyst comprises a zeolite and having coke deposit that includes at least 2 wt % hydrogen; feeding the partially deactivated catalyst to a first combustion zone of a regeneration zone operating at first regeneration conditions; passing a first regeneration gas stream comprising oxygen to the first regeneration zone to remove a portion of the coke therefrom, to generate a partially regenerated catalyst; feeding the partially regenerated catalyst to a second combustion zone of the regeneration zone operating at second regeneration conditions that are more severe than the first regeneration conditions; passing a second regeneration gas stream comprising oxygen to the second combustion zone; and feeding the regenerated catalyst having minimal hydrothermal damage back to the reaction zone. An embodiment of the invention is one, any or all of prior embodiments in this paragraph up through the first embodiment in this paragraph, wherein the first regeneration conditions include a temperature from about 480° C. (896° F.) to about 560° C. (1040° F.). An embodiment of the invention is one, any or all of prior embodiments in this paragraph up through the first embodiment in this paragraph, wherein the first regeneration conditions includes an oxygen concentration of between about 0.2 mol % $O_2$ and about 3 mol % $O_2$. An embodiment of the invention is one, any or all of prior embodiments in this paragraph up through the first embodiment in this paragraph, wherein the first combustion zone burns at least 25% of the total hydrogen from combustion. An embodiment of the invention is one, any or all of prior embodiments in this paragraph up through the first embodiment in this paragraph, wherein the pressure for the regenerator is between 2 psig to 50 psig and gas hourly space velocity of the first regeneration gas stream is between 1000 hr-1 and 10000 hr-1. An embodiment of the invention is one, any or all of prior embodiments in this paragraph up through the first embodiment in this paragraph, wherein the first regeneration gas stream is dried before entering the first combustion zone. An embodiment of the invention is one, any or all of prior embodiments in this paragraph up through the first embodiment in this paragraph, wherein the second regeneration conditions includes a temperature from about 500° C. (932° F.) to about 600° C. (1112° F.). An embodiment of the invention is one, any or all of prior embodiments in this paragraph up through the first embodiment in this paragraph, wherein the second regeneration conditions includes an oxygen concentration of between about 1 mol % $O_2$ to 5 mol % $O_2$. An embodiment of the invention is one, any or all of prior embodiments in this paragraph up through the first embodiment in this paragraph, wherein the first combustion zone and second combustion zone residence times are between 1 hour and 6 hours. An embodiment of the invention is one, any or all of prior embodiments in this paragraph up through the first embodiment in this paragraph, wherein the pressure for the regenerator is between 2 psig to 50 psig and the gas hourly space velocity of the second regeneration gas stream is between 1000 hr-1 and 10000 hr-1. An embodiment of the invention is one, any or all of prior embodiments in this paragraph up through the first embodiment in this paragraph, wherein the second regeneration gas stream is dried before entering the second combustion zone. An embodiment of the invention is one, any or all of prior embodiments in this paragraph up through the first embodiment in this paragraph, wherein the first regeneration gas stream and the second regeneration gas stream include a common gas loop. An embodiment of the invention is one, any or all of prior embodiments in this paragraph up through the first embodiment in this paragraph, wherein the first regeneration gas stream and the second regeneration gas stream include independent gas loops. An embodiment of the invention is one, any or all of prior embodiments in this paragraph up through the first embodiment in this paragraph, further comprising a third combustion zone at third combustion zone conditions including temperatures from about 540° C. to about 600° C., an oxygen concentration of 1 mol % $O_2$ to 5 mol % $O_2$, a residence time from about 1 hour to 6 hours, a pressure between 2 psig to 50 psig and a third regeneration gas stream having a gas hourly space velocity of the third regeneration gas stream between 1000 hr-1 and 10000 hr-1. An embodiment of the invention is one, any or all of prior embodiments in this paragraph up through the first embodiment in this paragraph, wherein the first regeneration gas stream, the second regeneration gas stream, and the third regeneration gas stream include a common gas loop. An embodiment of the invention is one, any or all of prior embodiments in this paragraph up through the first embodiment in this paragraph, wherein wherein the first regeneration gas stream, the second regeneration gas stream, and the third regeneration gas stream include independent gas loops.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:
1. A method of regenerating a catalyst comprising:
withdrawing a partially deactivated catalyst having coke formed thereon from a reaction zone wherein the partially deactivated catalyst comprises a zeolite and having coke deposit that includes at least 2 wt % hydrogen;
feeding the partially deactivated catalyst to a first combustion zone of a regeneration zone operating at first regeneration conditions;
passing a first regeneration gas stream comprising oxygen to the first regeneration zone to remove a portion of the coke therefrom, to generate a partially regenerated catalyst;
feeding the partially regenerated catalyst to a second combustion zone of the regeneration zone operating at second regeneration conditions that are more severe than the first regeneration conditions;
passing a second regeneration gas stream comprising oxygen to the second combustion zone; and
feeding the regenerated catalyst having minimal hydrothermal damage back to the reaction zone.

2. The method of claim 1, wherein the first regeneration conditions include a temperature from about 480° C. (896° F.) to about 560° C. (1040° F.).

3. The method of claim 1, wherein the first regeneration conditions includes an oxygen concentration of between about 0.2 mol % $O_2$ and about 3 mol % $O_2$.

4. The method of claim 1, wherein the first combustion zone burns at least 25% of the total hydrogen from combustion.

5. The method of claim 1, wherein the pressure for the regenerator is between 2 psig to 50 psig and gas hourly space velocity of the first regeneration gas stream is between 1000 hr-1 and 10000 hr-1.

6. The method of claim 1, wherein the first regeneration gas stream is dried before entering the first combustion zone.

7. The method of claim 1, wherein the second regeneration conditions includes a temperature from about 500° C. (932° F.) to about 600° C. (1112° F.).

8. The method of claim 1, wherein the second regeneration conditions includes an oxygen concentration of between about 1 mol % $O_2$ to 5 mol % $O_2$.

9. The method of claim 1, wherein the first combustion zone and second combustion zone residence times are between 1 hour and 6 hours.

10. The method of claim 1, wherein the pressure for the regenerator is between 2 psig to 50 psig and the gas hourly space velocity of the second regeneration gas stream is between 1000 hr-1 and 10000 hr-1.

11. The method of claim 1, wherein the second regeneration gas stream is dried before entering the second combustion zone.

12. The method of claim 1, wherein the first regeneration gas stream and the second regeneration gas stream include a common gas loop.

13. The method of claim 1, wherein the first regeneration gas stream and the second regeneration gas stream include independent gas loops.

14. The method of claim 1, further comprising a third combustion zone at third combustion zone conditions including temperatures from about 540° C. to about 600° C., an oxygen concentration of 1 mol % $O_2$ to 5 mol % $O_2$, a residence time from about 1 hour to 6 hours, a pressure between 2 psig to 50 psig and a third regeneration gas stream having a gas hourly space velocity of the third regeneration gas stream between 1000 hr-1 and 10000 hr-1.

15. The method of claim 14, wherein the first regeneration gas stream, the second regeneration gas stream, and the third regeneration gas stream include a common gas loop.

16. The method of claim 14, wherein the first regeneration gas stream, the second regeneration gas stream, and the third regeneration gas stream include independent gas loops.

* * * * *